(12) United States Patent
Fouarge et al.

(10) Patent No.: US 8,324,328 B2
(45) Date of Patent: Dec. 4, 2012

(54) SLURRY LOOP REACTORS

(75) Inventors: Louis Fouarge, Dilbeek (BE); Carl Van Camp, Beveren-Waas (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 13/214,879

(22) Filed: Aug. 22, 2011

(65) Prior Publication Data

US 2011/0306736 A1 Dec. 15, 2011

Related U.S. Application Data

(60) Division of application No. 12/777,333, filed on May 11, 2010, now Pat. No. 8,025,847, which is a continuation of application No. 11/501,181, filed on Apr. 8, 2008, now abandoned, and a continuation of application No. 12/243,346, filed on Oct. 1, 2008, now abandoned, which is a division of application No. 11/057,715, filed on Feb. 14, 2005, now abandoned.

(60) Provisional application No. 60/544,846, filed on Feb. 13, 2004.

(30) Foreign Application Priority Data

Feb. 13, 2004 (EP) .................................... 04100579

(51) Int. Cl.
*C08F 2/14* (2006.01)
(52) U.S. Cl. .............. 526/64; 526/65; 526/348; 525/52; 525/53; 422/132; 422/134

(58) Field of Classification Search ..................... 525/52, 525/53; 526/64, 65; 422/132, 134
See application file for complete search history.

(56) References Cited

U.S. PATENT DOCUMENTS 7,034,092 B2 * 4/2006 Marechal ........................ 526/65
* cited by examiner

*Primary Examiner* — Roberto Rabago

(57) ABSTRACT

An apparatus defined as a set of loop reactors suitable for the polymerization process of a monomer, preferably ethylene and optionally an olefin co-monomer, comprising for each of said reactors:
  a plurality of interconnected pipes P defining a flow path for a polymer slurry, said slurry consisting essentially of ethylene, optionally a co-monomer, a polymerization catalyst, liquid diluent and solid olefin polymer particles,
  means for feeding monomer, optionally a co-monomer, diluent and optionally hydrogen in the reactor,
  means for feeding a polymerization catalyst in the reactor,
  a pump suitable for maintaining the polymer slurry in circulation in such reactor,
  one or more settling legs connected to the pipes P of such reactor for settling of polymer slurry,
  one or more control valves connected to the outlet of such settling legs, and
  one or more flash lines for discharging settled polymer slurry out of the reactor characterized in that each of said loop reactors comprises a three-or-more-way valve defining three-or-more ends, one end A being positioned at the outlet of said one or more control valves.

4 Claims, 2 Drawing Sheets

SLURRY LOOP REACTORS

CROSS-REFERENCE TO RELATED APPLICATIONS

This application is a divisional of U.S. patent application Ser. No. 12/777,333, filed May 11, 2010, which issued as U.S. Pat. No. 8,025,847, which is a continuation of U.S. patent application Ser. No. 11/501,181, filed Apr. 8, 2008 (now abandoned), and is a continuation of U.S. patent application Ser. No. 12/243,346, filed Oct. 1, 2008, (now abandoned), which is a divisional of U.S. patent application Ser. No. 11/057,715, filed Feb. 14, 2005 (now abandoned), which claims priority from U.S. Pat. Appl. Ser. No. 60/544,846, filed Feb. 13, 2004 (now abandoned).

The subject of the present invention relates to the polymerization of olefin monomers in slurry loop reactors and particularly to an apparatus and a method to switch such reactors from parallel to series configuration and vice-versa.

The use of slurry-loop reactor systems in the polymerization of olefin monomers is well known in the art. (see for example U.S. Pat. No. 2,285,721). In such system, it is desirable to separate the polymer and the liquid medium comprising an inert diluent and unreacted monomers without exposing the liquid medium to contamination so that said liquid medium can be recycled to the polymerization zone with minimal or no purification, As described in U.S. Pat. No. 3,152,872, a slurry of polymer and the liquid medium is collected in one or more settling legs of the slurry loop reactor from which the slurry is discharged to a flash chamber. The mixture is flashed in order to remove the liquid medium from the polymer.

For years, those slurry-loop reactors have been operated in a stand-alone configuration for, e.g., the production of monomodal polyolefins.

It has also been known in the art (since for example EP 0 057 420 or EP 0 022 376) that polymerization reactors can be connected in series with, as a result among others, the production of polyolefins with a wide molecular weight distribution, very good homogeneity and outstanding mechanical and processing properties.

The "modality" of a polymer refers to the form of its molecular weight distribution curve, i.e. the appearance of the graph of the polymer weight fraction as function of its molecular weight. If the polymer is produced in a sequential step process, utilizing reactors coupled in series and using different conditions in each reactor, the different fractions produced in the different reactors will have their own molecular weight distribution. It is to be noted that also the chemical compositions of the different fractions may be different.

There however remains the need to be able to produce several kinds of polyolefins such as monomodal or multimodal grades from reactors whether or not connected in series, for different reasons such as a particular need for certain mechanical properties (exclusively obtained either in parallel or in series configuration), for a given residence time, for certain catalyst combination, production issues, equipment availability, plant flexibility, . . . .

Until now, polyolefin manufacturers have been able to manage production of the several kinds of above mentioned polyolefin grades by:
either having dedicated single polymerization reactors on the one hand and dedicated polymerization reactors connected to each other and operated in series, on the other hand,
or being obliged to swing from series to parallel on the same reactor trains.

The first solution is extremely capital intensive.

The second one is extremely time and operation consuming. In this second option, large pieces of connection pipes must indeed be assembled and later disassembled and reassembled again, with all their related utility lines such as flushing lines, heat exchange jackets, measurement and control devices, frame supports, . . . . Connections can often be damaged and the risk for a catastrophic accident is real so that operations are not smooth and are glow down anyway.

A slurry loop reactor run on its own with its settling legs and flash line is already known and does not have to be described here; reference is made, for example, to Patents U.S. Pat. Nos. 3,152,872-A, 3,242,150-A and 4,613,484-A.

Embodiments to operate reactors connected in series are described in details in, for instance, U.S. Pat. Nos. 6,185,349, 4,297,445, EP 0 057 420.

DESCRIPTION OF THE INVENTION

Figure 1:
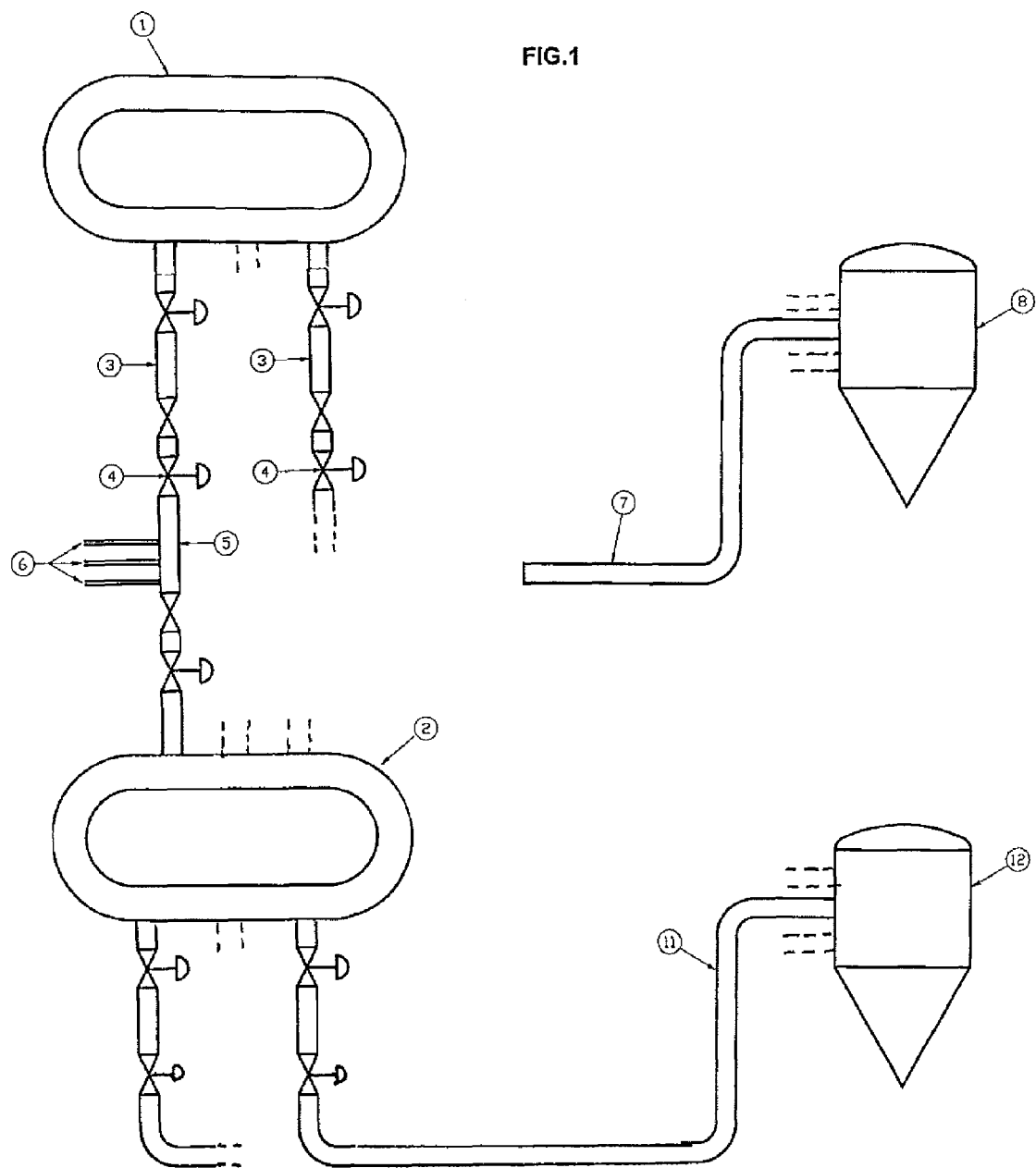
FIG. 1 represents a schematic part of the process flow diagram of an ethylene polymerization unit.

An example of current disassembling procedure "series-parallel" is given here below supported by FIG. 1.

When operated in series, according to one embodiment, reactor 1 and reactor 2 are connected to each other, in particular, through one or more settling leg 3 (said settling leg being regulated by a control valve 4) and line 5. Iso-butane flushing connections 6 are made into connection line 5. Slurry is transferred from reactor Ito reactor 2. In this series configuration, flash line 7 going to flash tank 8 is not in service. Flash line 11 going from reactor 2 to flash tank 12 is in service. For transitioning to parallel configuration, one has to stop the reaction, empty the reactors, dismount connections 6, take away connection line 5, and connect flash line 7 to the control valve 4. The complete operation from shut down to start up (indifferently from series to parallel or vice versa) takes up to 72 hrs.

It is an object of the present invention to provide an apparatus and an effective method to easily switch from series to parallel configuration of the slurry loop reactors and vice-versa. It is anticipated that such method can be applied to any type of olefin polymerization such as in closed reaction vessels provided with stirring means, gas phase reactors and combination of those.

Figure 2:
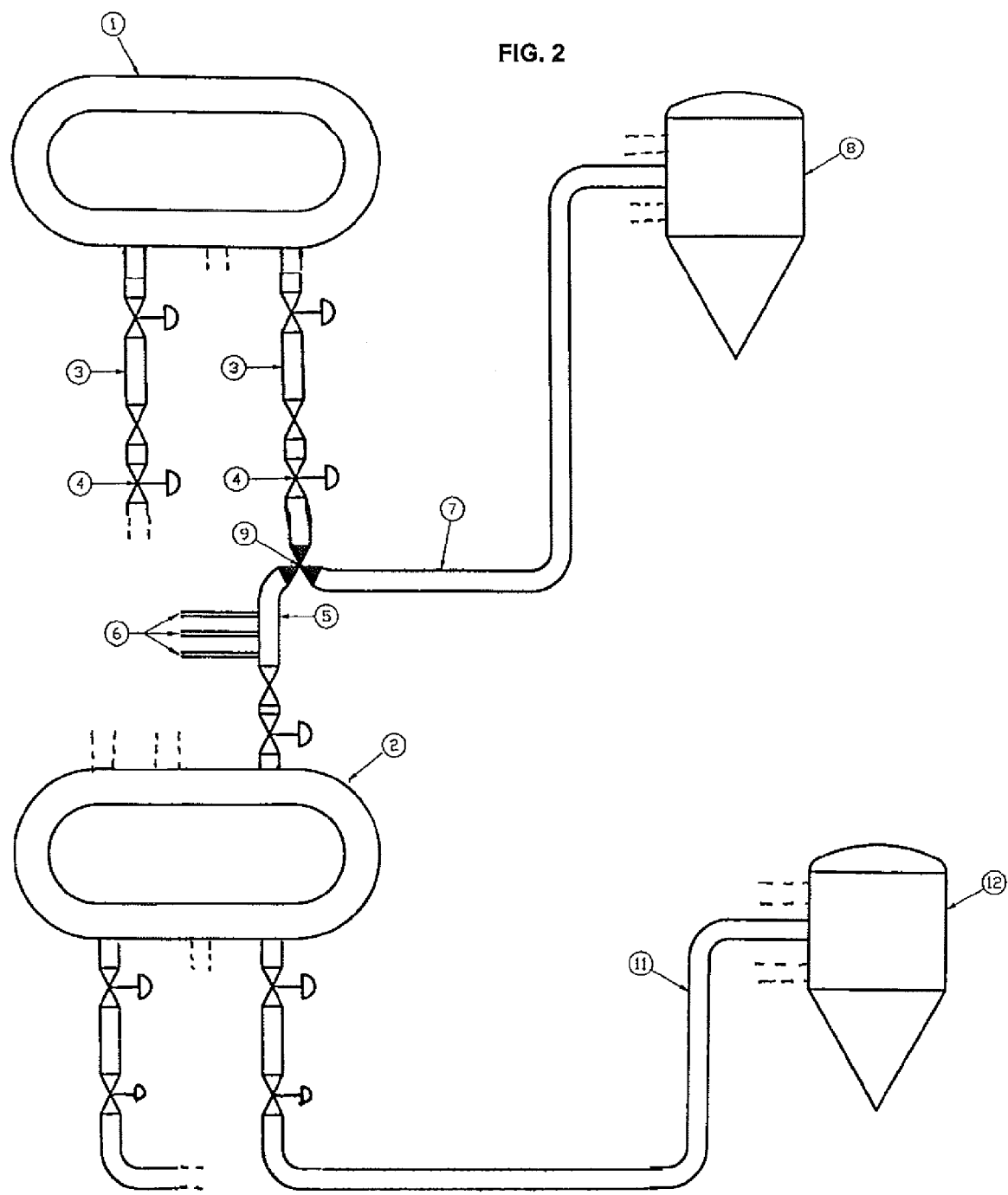
FIG. 2, represents a schematic part of the process flow diagram of an ethylene polymerization unit, incorporating the present invention.

Accordingly the present invention discloses an apparatus to easily switch from series to parallel configuration of slurry loop reactors and vice-versa and the related method. The disclosure is supported by FIG. 2, which represents a schematic part of the process flow diagram of an ethylene polymerization unit, incorporating the present invention.

All connections 6 remain at their place for series or parallel and the choice for one configuration or the other is made through the position of the three-or more-way valve 9 positioned after the control valve 4 of the one or more settling legs 3. The three-or more-way valve is open in the direction 1-2 when the reactors are operated in series. The three-or more-way valve is open in the direction 1-8 when reactor 1 is run individually.

Up to the invention, three-or more-way valves were not expected to work properly because they are known to leak in their non-used direction and to get easily blocked by undesired polymerization in the non-used pipe (said non-used pipe being either the one or more transfer legs/connection lines 3-5 to reactor 2 when the reactors are run in parallel configuration or, the one or more flash lines 7 to the flash tank 8 of reactor 1 when reactors are run in series configuration). Blocking the non-used pipe means the obligation for the exploitation manager to kill the polymerization reaction in the two reactors, empty the reactors from all their slurry, clean the blocked sections, possibly change the blocked valve and reassemble everything. The complete operation takes up to 120 hrs, which makes it completely prohibitory from a financial point of view. Safety issues are not of the least either.

Moreover, control valves were not expected to work properly from a process point of view (i.e. to enable transfer of sufficient amounts of solids) together with three-or more-way valves, said three-or more-way valves that would have indifferently imposed on the control valves a pressure differential of about the value of the nominal pressure of each reactor— i.e. several tens of bars—(when reactors are operated in parallel, i.e. with the settling leg discharging the slurry from reactor I run at its nominal pressure $p_1$ into the flash line maintained around atmospheric pressure) or a pressure differential of a few bars (when reactors are operated in series, i.e. with the settling leg transferring the slurry from reactor 1 run at pressure $p_1$ into reactor 2 run at pressure $p_2$, with $p_1 > p_2$, allowing the transfer).

It has been surprisingly found that control valves 4 and three-or more-way valves 9 can however be positively used in the following apparatus:

a set of loop reactors suitable for the polymerization process of a monomer, preferably ethylene and optionally an olefin co-monomer, comprising for each of said reactors:
  a plurality of interconnected pipes P defining a flow path for a polymer slurry, said slurry consisting essentially of ethylene, optionally a co-monomer, a polymerization catalyst, liquid diluent and solid olefin polymer particles,
  means for feeding monomer, optionally a co-monomer, diluent and optionally hydrogen in the reactor,
  means for feeding a polymerization catalyst in the reactor,
  a pump suitable for maintaining the polymer slurry in circulation in such reactor,
  one or more settling legs connected to the pipes P of such reactor for settling of polymer slurry,
  one or more control valves connected to the outlet of such settling legs, and
  one or more flash lines for discharging settled polymer slurry out of the reactor characterized in that each of said loop reactors comprises a three-or-more-way valve defining three-or-more ends, one end A being positioned at the outlet of said one or more control valves, another end B being connected to said one or more flash lines and another end C being connected to the pipes P of another reactor of the set through a connection pipe 5.

In a second embodiment of the present invention, the diameter of the one or more control valves, flash lines, connection lines K and three-or-more-way valves are within a relative ratio of from 0.5 to 2, preferably of from 0.65 to 1.55 and more preferably of from 0.8 to 1.2

In a third embodiment of the present invention, the length of the one or more flash lines divided by the length of the one or more connection pipes K is within a range of from 6 to 14 and preferably from 8 to 12.

In a fourth embodiment of the present invention, any end of the three-or-more-way valve, which is not connected to either a flash line or another reactor of the set is flushed with a diluent suitable with the polymerization process.

In a fifth embodiment according to the present invention, a continuous over-pressure of a diluent suitable with the polymerization process is maintained at the opposite side of the used connection (said used connection being either A to B when reactors are run in parallel configuration or, A to C when reactors are run in series configuration).

In a sixth embodiment according to the present invention, a continuous over-pressure of a diluent suitable with the polymerization process is maintained at the side of the non-used pipe (said non-used pipe being either the transfer legs/connection lines 3-5 to the second reactor when the reactors are run in parallel configuration or, the flash lines 7 to the flash tank 8 of the first reactor when reactors are run in series configuration).

In a seventh embodiment according to the present invention, a diluent suitable with the polymerization process is circulated throughout the reactors for a period of eight hours before transitioning from series to parallel configuration or vice versa.

In a eight embodiment according to the present invention, when the diluent suitable with the polymerization process is iso-butane, the full capacity of iso-butane dedicated to all reactors is applied in sequence to each individual reactor during the circulation period.

In a ninth embodiment according to the present invention, olefin-free recycled iso-butane is fed into the reactors during the circulation period.

EXAMPLES

Example 1 and Comparative Example 1

The same high-density polyethylene was produced on the same reactors connected in series according to the invention (E1) and after conventional assembling (CE1), in both cases, starting from reactors previously run individually (parallel) The time between "parallel" shut down and "series" start up (Transition Time) is given in Table 1 as well as density, melt index and ESCR of each grade and running hours in series.

TABLE 1

|  | E1 | CE1 |
|---|---|---|
| Transition Time (hrs) | 12 | 66 |
| Density (g/cm$^3$) | 0.948 | 0.948 |
| MI-2 (dg/min) | 0.28 | 0.28 |
| ESCR [F-50] (hrs) | 1540 | 1540 |
| Running hours w/o problem (hrs) | >7600 | >7565 |

As can be observed from Table 1, Transition Time is substantively reduced from 66 hrs to 12 hrs for producing exactly the same product and for the essential same period of time without any leakage or blocking of the valves.

Example 2 and Comparative Example 2

A period of one year of production was recorded with and without the benefit of the invention (i.e. with the pipes designed according to the invention on the one hand—E2—and with the standard procedure of dismounting on the other hand—CE2), for the manufacture of essentially the same polyethylene products in both parallel and series configuration, for a given number (12) of switches from parallel to series configuration and vice-versa. The results are gathered in Table 2.

TABLE 2

|  | E2 | CE2 |
|---|---|---|
| Number of switches | 12 | 12 |
| Running time of prime grade (hrs) | 8254 | 7234 |

As can be observed, for the same number of switches from parallel to series configuration and vice versa, the total running time of prime production is about 14% higher when taking advantage of the invention. 85 hrs in average were gained at each switch of configuration when taking advantage of the invention.

Examples 3, 4 and Comparative Examples 3, 4

Starting from the parallel configuration, two 65 m³ polyethylene slurry loop reactors equipped with three-or more-way valves and with the pipes designed according to the invention on the one hand (E3 and E4) as shown in Table 3 and with standard designed pipes on the other hand (CE3 and CE4) were run for about one month.

According to the invention, an 0.1 bar over-pressure of iso-butane was maintained at the side of the non-used pipe According to the invention, 65 kg of a blend of nitrogen with 3% oxygen was introduced in each of the reactors six hours before transitioning.

According to the present invention, olefin-free iso-butane was circulated throughout the reactors for a period of six hours before transitioning.

After that about one month production period, it was then decided to switch to the series configuration. In the examples according to the invention, transition time during the first transition was about 19 hrs. On average, for the 9 further transitions series-parallel and vice-versa of the recorded year period, transition time was about 12 hrs.

With the pipes designed as shown in Table 3 for the Comparative Examples, it was simply impossible to switch in either configuration because of several connections and valves blocked by undesirable amounts of polyethylene

TABLE 3

|  | E3 | E4 | CE3 | CE4 |
|---|---|---|---|---|
| Ratio 'Diameter Flash line/Diameter control valve' | 0.50 | 1.88 | 0.38 | 2.2 |
| Ratio 'Diameter Connection line/Diameter control valve' | 0.71 | 2.0 | 0.18 | 5.7 |
| Ratio 'Diameter Connection line/Diameter Flash line' | 1.47 | 1.1 | 0.47 | 2.6 |
| Ratio 'Length Flash line/Length Connection line' | 10.6 | 10.6 | 20 | 20 |
| Number of switches possible | >10 still running | >10 still running | 0 | 0 |

The invention claimed is:
1. A multi-reactor polymerization process for the production of an olefin polymer comprising:
   a) introducing an olefin monomer, a polymerization catalyst and a diluent carrier liquid into a first reactor of a multi-reactor polymerization system and circulating said diluent liquid and monomer in said first reactor to polymerize said monomer in the presence of said catalyst system to produce a slurry of polymer particles in said diluent carrier liquid;
   b) introducing an olefin monomer, a polymerization catalyst and a diluent carrier liquid into a second reactor of said multi-reactor polymerization system and circulating said diluent liquid and monomer in said second reactor to polymerize said monomer in the presence of said catalyst system to produce a second slurry of polymer particles in said diluent carrier liquid;
   c) directing said polymer slurry in said first reactor into a settling leg connected to said first reactor; and
   d) periodically transferring polymer slurry from said settling leg of said first reactor into a transfer line having a multi-position valve having a first position in which said transfer line is open to an inlet of said second reactor and a second position in which said transfer line is closed to the inlet of said second reactor and open to a flash line providing an exit for the withdrawal of polymer slurry from said process;
   e) operating said multi-position valve in said transfer line in said first position to provide for a series mode of operation of said first and second reactors or in said second position in which said first and second reactors are operated in a parallel mode of operation;
   f) directing polymer slurry in said second reactor into a settling leg connected to said second reactor; and
   g) transferring polymer slurry from said second reactor settling leg into a flash line for withdrawal of polymer slurry from said second reactor.

2. The method of claim 1 further comprising switching said multi-position valve from one of said first and second positions to the other of said first and second positions to change the operation of said first and second reactors from one of said modes of operation to the other of said modes of operation.

3. The method of claim 2 wherein prior to switching said valve to transition said process from one mode of operation to another mode of operation, terminating the operation of said reactors and circulating a diluent liquid through said reactors for at least 8 hours before switching said valve to transition from one mode to another mode of operation.

4. The method of claim 2 further comprising supplying a diluent liquid to a portion of said multi-position valve to which polymer slurry is not flowing after switching said valve to transition said process from one mode of operation to another.

* * * * *